United States Patent
Kilbreath et al.

(10) Patent No.: US 10,167,765 B2
(45) Date of Patent: Jan. 1, 2019

(54) EXHAUST GAS SEAL

(71) Applicant: GM GLOBAL TECHNOLOGY OPERATIONS LLC, Detroit, MI (US)

(72) Inventors: Randell W. Kilbreath, Grand Blanc, MI (US); Kulwinder Singh, Rochester Hills, MI (US); Richard Casper, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 220 days.

(21) Appl. No.: 15/208,115

(22) Filed: Jul. 12, 2016

(65) Prior Publication Data

US 2018/0016963 A1   Jan. 18, 2018

(51) Int. Cl.

| F01N 13/08 | (2010.01) |
|---|---|
| F01N 3/20 | (2006.01) |
| F01N 13/18 | (2010.01) |
| F01N 3/10 | (2006.01) |
| F16L 55/07 | (2006.01) |

(52) U.S. Cl.
CPC ......... *F01N 13/1827* (2013.01); *F01N 3/101* (2013.01); *F01N 3/2066* (2013.01); *F01N 13/08* (2013.01); *F16L 55/07* (2013.01)

(58) Field of Classification Search
CPC ...... F01N 13/1827; F01N 13/08; F01N 13/18; F01N 3/101; F01N 3/2066; F01N 3/2892; F01N 3/36; F01N 3/0021; F01N 13/009; F16L 55/07

USPC ........................................................... 60/324
See application file for complete search history.

(56) References Cited

U.S. PATENT DOCUMENTS

| 6,698,193 | B2 * | 3/2004 | Duerr ........................ F01N 3/28 60/302 |
|---|---|---|---|
| 8,745,978 | B2 * | 6/2014 | Vanvolsem ............ B01D 53/90 366/336 |
| 2004/0207162 | A1 * | 10/2004 | Kubota ................... F16J 15/126 277/650 |
| 2013/0205758 | A1 * | 8/2013 | Tsuchiya ............... B01F 5/0451 60/317 |
| 2016/0123209 | A1 * | 5/2016 | Wright .................. F01N 3/2066 60/301 |

* cited by examiner

*Primary Examiner* — Phutthiwat Wongwian
*Assistant Examiner* — Kelsey Stanek
(74) *Attorney, Agent, or Firm* — Quinn IP Law

(57) ABSTRACT

A gas seal for a pipe joint in an exhaust system configured to receive an exhaust gas flow from internal combustion (IC) engine includes a seal element. The seal element includes an outer surface and an inner surface arranged concentrically about a first axis. The outer surface is configured to seal against a pipe of the exhaust system. The gas seal also includes a flow-guide element fixed to the seal element at the inner surface of the seal element. The flow-guide element defines an aperture having a shape configured to direct and focus the exhaust gas flow away from the first axis. An exhaust system and a vehicle having such a gas seal are also disclosed.

20 Claims, 3 Drawing Sheets

US 10,167,765 B2

EXHAUST GAS SEAL

TECHNICAL FIELD

The present disclosure is drawn to a gas seal for an exhaust system of an internal combustion engine.

BACKGROUND

Internal combustion (IC) engines typically include exhaust systems designed to collect, route, and discharge the engine's exhaust gases. An exhaust system commonly includes piping to guide exhaust gases away from the engine. Exhaust systems of modern IC engines also include various exhaust after-treatment devices, such as three-way catalysts and other devices, to effectively convert toxic byproducts of combustion to less toxic substances by way of catalyzed chemical reactions.

SUMMARY

An embodiment of the present disclosure is directed to a gas seal for a pipe joint in an exhaust system configured to receive an exhaust gas flow from internal combustion (IC) engine is disclosed. The gas seal includes a seal element having an outer surface and an inner surface arranged concentrically about a first axis. The outer surface is configured to seal against a pipe of the exhaust system. The gas seal also includes a flow-guide element fixed to the seal element at the inner surface of the seal element. The flow-guide element defines an aperture having a shape configured to direct and focus the exhaust gas flow away from the first axis.

The aperture of the flow-guide element may have either a circular or a non-circular, e.g., oblong, shape.

The flow-guide element aperture can be centered on a second axis, wherein the second axis is spaced apart from the first axis.

The seal element can be constructed from a matrix of graphite with embedded metal and the flow-guide element can be constructed from stainless steel, each capable of withstanding elevated temperatures of the IC engine's exhaust gas.

The outer surface of the seal element may include a conical portion configured to take up or absorb misalignment in the pipe joint.

The flow-guide element can include a portion extending along the first axis and concentrically with the outer surface and the inner surface of the seal element. The subject portion can define a slot configured to maintain a position of the gas seal in the pipe joint during assembly thereof via a generated spring force, e.g., via an interference fit inside the pipe joint.

The gas seal may additionally include a feature, such as a key, configured to orient the aperture of the flow-guide element within the pipe joint.

Further embodiments of the present disclosure are directed to an exhaust system and a vehicle employing the disclosed gas seal.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
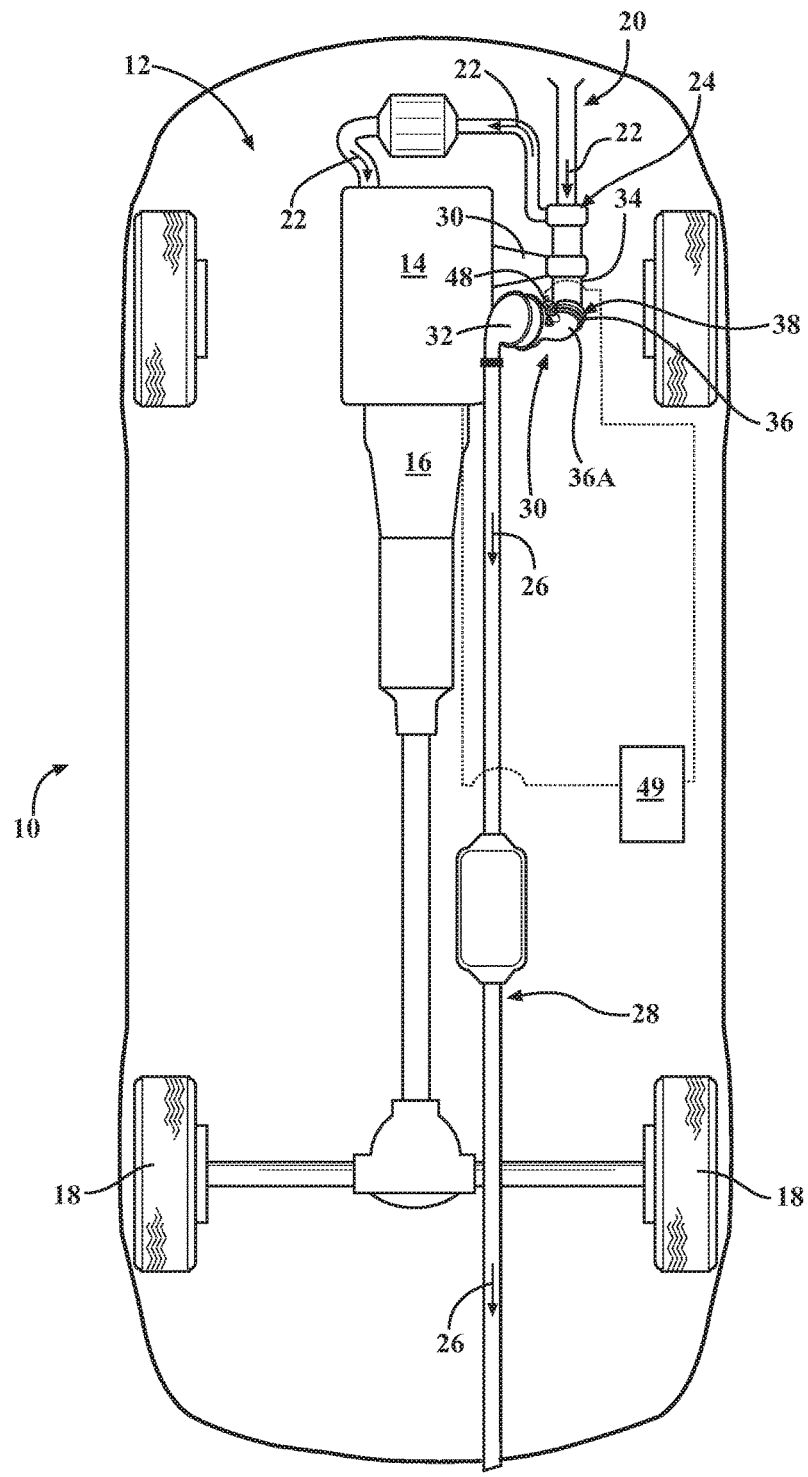
FIG. 1 is a schematic illustration of a vehicle employing an internal combustion engine connected to an exhaust system having a pipe joint.

Referring to the drawings, wherein like reference numbers refer to like components throughout the several views, FIG. 1 schematically depicts a vehicle 10. The vehicle 10 employs a powertrain 12. The powertrain 12 includes an internal combustion engine 14, a transmission 16, and drive wheels 18, wherein the engine is configured to power the vehicle by sending engine torque through the transmission to the drive wheels. The engine 14 may be a diesel, i.e., a compression-ignition type, or a gasoline, i.e., a spark-ignition type, of an engine. Although the vehicle 10 is depicted as having a standard powertrain 12, where the primary powerplant is the engine 14, the vehicle may also be a hybrid type, where one or more electric motors (not shown) are used in powering the vehicle.

The engine 14 includes an air intake system 20. The air intake system 20 is configured to deliver an ambient airflow 22 to the engine 14 for subsequent combining of the airflow and an appropriate amount of fuel inside the engine's combustion chambers. As shown, the engine 14 may also include an engine exhaust-driven turbocharger 24. The turbocharger 24 is operable to increase volumetric efficiency of the engine 14 by pressurizing the incoming airflow 22 for subsequent delivery of the pressurized air charge to the engine's combustion chambers. As shown, the turbocharger 24 is energized by an exhaust gas flow 26 that is emitted by the engine 14 following each combustion event as a byproduct of combustion and is removed to the ambient after the turbocharger through an exhaust system 28.

With continued reference to FIG. 1, the exhaust system 28 includes an exhaust after-treatment (AT) system having one or more exhaust AT devices configured to receive and process flow of the exhaust gas flow 26 from the engine 14 for reduction of toxic exhaust gas emissions. The exhaust system 28 also includes a number of interconnected exhaust pipes, to be discussed in greater detail below. Such exhaust pipes are used to fluidly connect the exhaust AT device(s) to the engine 14. The exhaust system 28 may additionally include an exhaust manifold 30, which can be a separate component fastened to the engine, as shown in FIG. 1. The exhaust manifold 30 can also be part of the engine 14, such as integrated into the engine's cylinder head (not shown).

In the event that the engine 14 is a gasoline engine, as shown in FIG. 1, a three-way catalytic converter 32, which is a gas-engine-specific exhaust AT device, may be employed. As understood by those skilled in the art, a three-way catalytic converter 32 is an exhaust after-treatment device that simultaneously performs three tasks: i) oxidation of nitrogen oxides, ii) oxidation of carbon monoxide, and iii) oxidation of unburned hydrocarbons. The three-way catalytic converter 32 may be regenerated to unload the deposited hydrocarbon emissions in order to forestall elevated temperatures in the catalyst that may eventually cause damage thereto. The first two tasks listed above employ a process of selective catalytic reduction (SCR) for converting oxides of nitrogen, also referred to as $NO_X$ with the aid of a catalyst into diatomic nitrogen, $N_2$, and water, $H_2O$. SCR is frequently employed to reduce $NO_X$ emissions in the exhaust of internal combustion engines used to power motor vehicles. Exhaust emissions of both gasoline and diesel engines may be improved by SCR.

In the event that the engine 14 is a diesel engine, the exhaust system 28 may include a series of exhaust aftertreatment devices, typically a diesel oxidation catalyst, a selective catalytic reduction (SCR) catalyst, and a diesel particulate filter, none of which are shown, but are known to those skilled in the art. Such a series of exhaust aftertreatment devices can be employed to reduce various exhaust emissions of the diesel engine. Specifically, the SCR catalyst is employed to reduce the emission of $NO_X$ via the SCR process described above with respect to the gasoline engine specific three-way catalytic converter 32.

Precise positioning of the engine and the exhaust system 28 may vary due to production tolerances inherent to a fabricated structure of the vehicle 10. Additionally, the engine 14 typically experiences vibration during its operation in the vehicle 10, while the exhaust system 28 may shake and/or oscillate in response to the vehicle traversing uneven ground. However, effectiveness of the each of the above-described AT devices, whether in the gasoline or diesel embodiment of the engine 14, is directly affected by distribution of the exhaust gas flow 26 across the face of the particular device. Accordingly, various techniques and devices maybe needed to account for and absorb positional variation of the engine 14 and/or the exhaust system 28 in the vehicle 10. Furthermore, it would be beneficial to absorb such variation and vibrations in various exhaust system 28 joints, while minimizing leakage of the exhaust gas flow 26 along the way.

Figure 2:
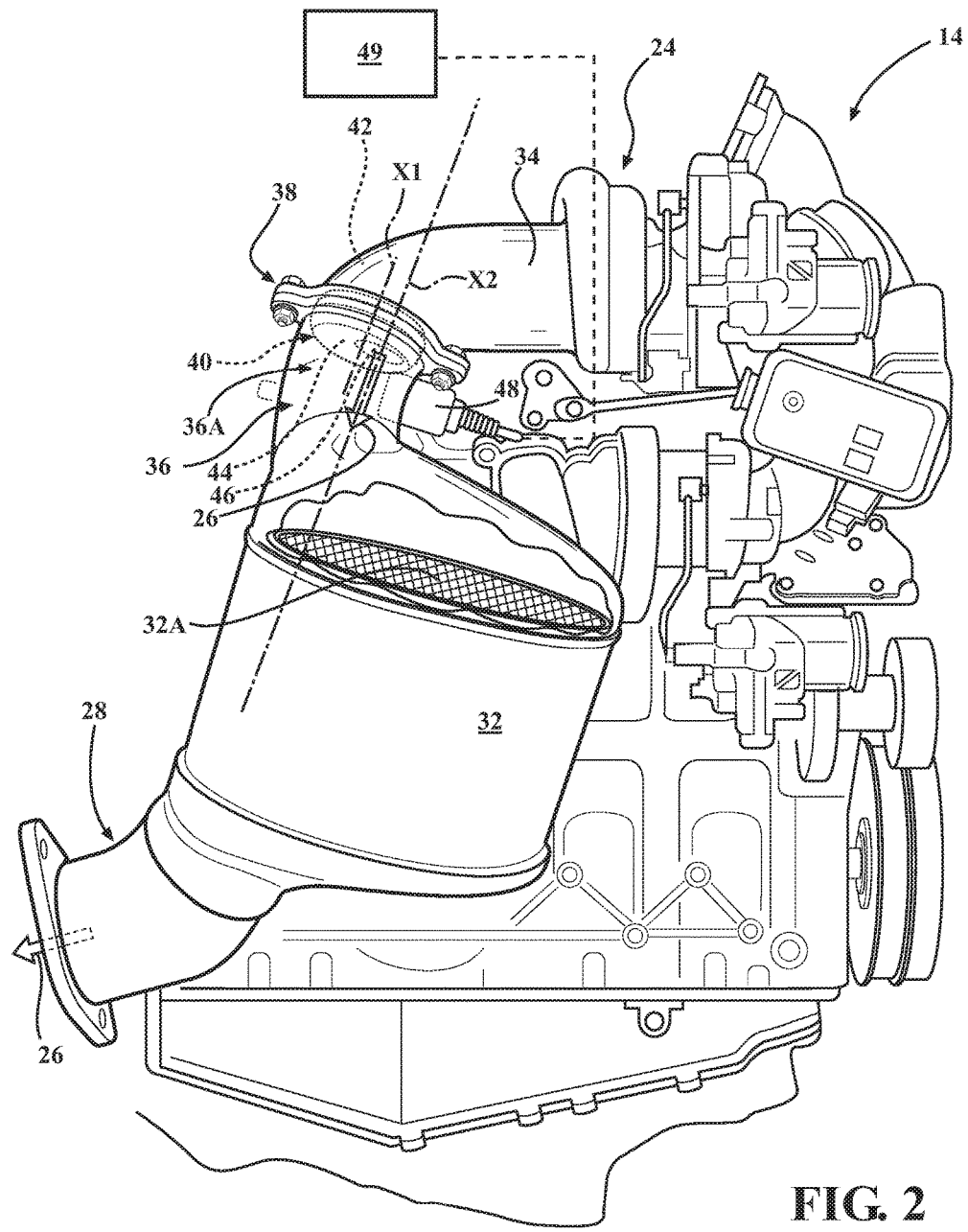
FIG. 2 is a schematic partially cut-away perspective view of the pipe joint shown in FIG. 1, depicting a gas seal arranged at the pipe joint.

As shown in the exemplary embodiment of FIG. 2, the exhaust system 28 includes a first exhaust pipe 34 and a second exhaust pipe 36 used to fluidly connect the exhaust AT device(s) to the engine 14. The first exhaust pipe 34 may either be part of exhaust manifold 30 (shown in FIG. 1) or part of a turbine housing for the turbocharger 24, as understood by those skilled in the art. The second exhaust pipe 36 is connected to the first exhaust pipe at a pipe joint 38. Accordingly, the subject exhaust AT device(s) receives and processes the exhaust gas flow 26 downstream of the pipe joint 38. A gas seal 40 is arranged at the pipe joint 38 between the first exhaust pipe 34 and the second exhaust pipe 36. One of the key objectives of the gas seal 40 is to minimize leakage of the exhaust gas flow 26 at the pipe joint 38. As understood by those skilled in the art, each of the first and second exhaust pipes 34, 36 can include a respective mounting flange (not shown) for effective contact with the gas seal 40 at the pipe joint 38. Additionally, the pipe joint 38 can be secured via a weld or a suitable fastener, such as an adjustable clamp 41, to maintain a reliably sealed pipe joint during operation of the engine 14.

For the purpose of achieving a quicker light-off of the subject AT device, i.e., more rapid heat up of the catalyst following a cold start of the engine 14, the AT device can be close-coupled to the engine 14. Such catalyst light-off considerations may necessitate a bend 36A being incorporated into the second exhaust pipe 36 proximate to and upstream of the AT device for compact packaging of the close-coupled AT device in an otherwise restricted space near the engine 14. Although the exemplary AT device may be of any type noted above, the present disclosure will hereafter concentrate on a gas-engine-specific three-way catalytic converter 32 embodiment thereof.

Figure 3:
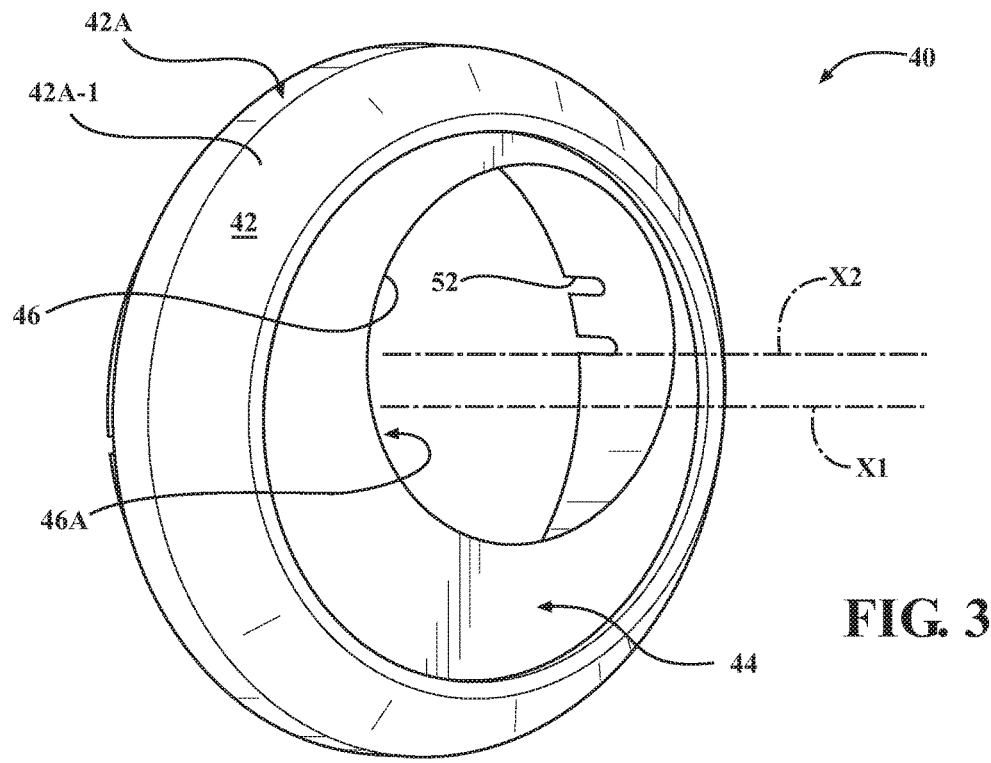
FIG. 3 is a schematic perspective view of the gas seal shown in FIG. 2, according to one embodiment.
Figure 4:
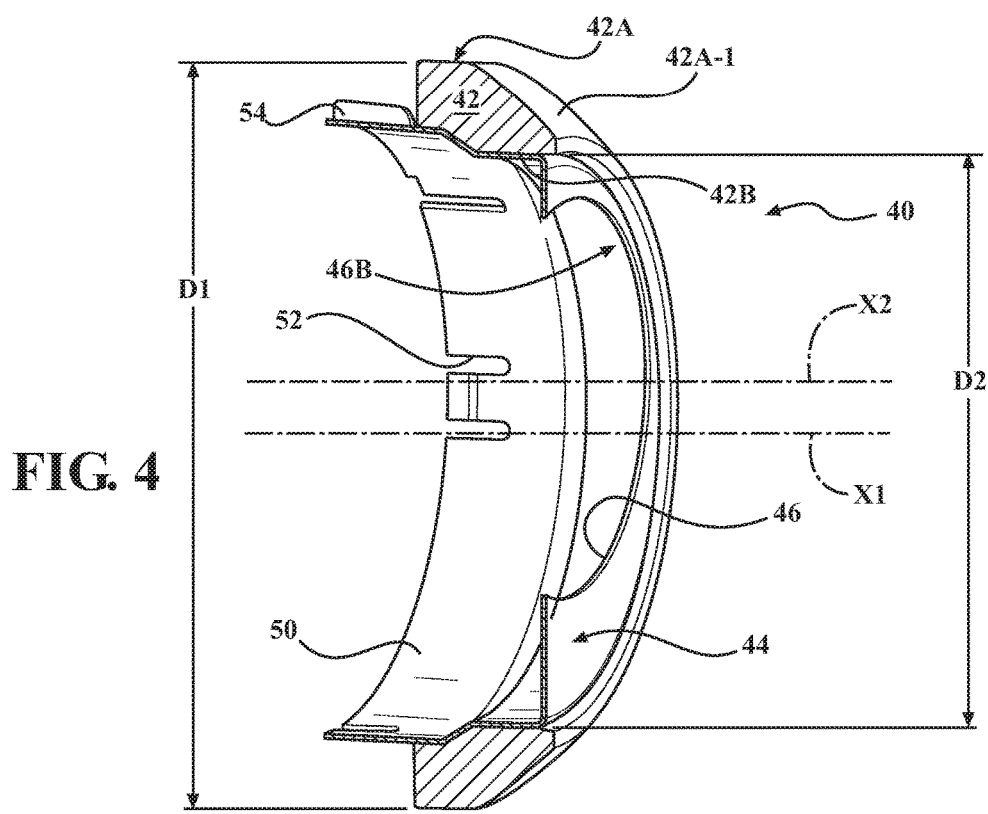
FIG. 4 is a schematic perspective cross-sectional view of the gas seal shown in FIG. 2, according to another embodiment.

With reference to FIGS. 3 and 4, the gas seal 40 includes a seal element 42. As shown in FIG. 4, the seal element 42 includes an outer surface 42A having an outer diameter D1. The outer surface 42A is configured to seal the pipe joint 38. The gas seal 40 also includes an inner surface 42B, as defined by an inner diameter D2. As can be seen in FIGS. 2-4, the outer surface 42A and the inner surface 42B are arranged concentrically about a first axis X1. The outer surface 42A of the seal element 42 may include a conical portion 42A-1 (shown in FIGS. 3 and 4) configured to absorb or take up misalignment in the pipe joint 38 that may occur during installation of the exhaust system 28 in the vehicle 10 or during operation of thereof. The seal element 42 can be constructed from a matrix of graphite with embedded metal for the material's ability to conform to variably shaped contact surfaces of the first and second exhaust pipes 34 and 36, while withstanding elevated temperatures of the exhaust gas flow 26.

With continued reference to FIGS. 3 and 4, the gas seal 40 additionally includes a flow-guide element 44 fixed to the seal element 42 at the inner surface 42B. The flow-guide element 44 can be constructed from stainless steel or other formable heat-resistant material primarily for the material's ability to withstand elevated temperatures of the exhaust gas flow 26. As known by those skilled in the art, during certain operating conditions of a diesel engine temperatures of the exhaust gas flow 26 may exceed 1,500 degrees Fahrenheit, while exhaust gas flow temperatures in a gasoline engine may exceed 2,000 degrees Fahrenheit. The flow-guide element 44 can be fixed to the seal element 42 via a suitable weld extending around the inner surface 42B such that the resultant seam blocks leakage of exhaust gas flow 26 therethrough.

The flow-guide element 44 defines an aperture 46 having a shape configured to direct and focus the exhaust gas flow 26 away from the first axis X1 and toward the three-way catalytic converter 32, and specifically toward the catalyst's brick face 32A. Additionally, the shape of the aperture 46 is intended to enhance uniformity of the exhaust gas flow 26 downstream of the gas seal 40. Specifically, the aperture 46 may have a circular shape 46A. Alternatively, the aperture 46 may have a non-circular, such as oblong or oval, shape 46B. As shown, the shape of the aperture 46, whether the circular shape 46A or the non-circular shape 46B, can be centered on a second axis X2 that is spaced apart from and is substantially parallel to the first axis X1. Accordingly, when the aperture 46 is centered on the second axis X2, the exhaust gas flow 26 is redirected and guided along the second axis.

The guiding of the exhaust gas flow 26 along the second axis X2 can be especially beneficial if the three-way catalytic converter 32 is connected to the second exhaust pipe 36 just downstream of the bend 36A. In such an embodiment, the three-way catalytic converter 32 brick face 32A is arranged at an angle to the first axis X1, but, in the absence of the flow-guide element 44, the exhaust gas flow 26 would flow along the first axis X1 and not have a direct shot at the brick face. In such a situation, the exhaust gas flow 26 would initially impact a wall of the second exhaust pipe 36, while the three-way catalytic converter 32 would receive a substantial portion of the exhaust gas flow only after it reflected off the second exhaust pipe wall. As a result, the three-way catalytic converter 32 would experience a delayed light-off following the cold start of the engine 14, despite being close-coupled thereto.

According to the present disclosure, to alleviate the above condition, the flow-guide element 44 is positioned in the pipe joint 38 with respect to the three-way catalytic converter 32 to direct the exhaust gas flow 26 along the second axis X2 by the aperture 46. As a result, a specifically selected orientation of the aperture 46 with respect to the three-way catalytic converter 32 is used to guide the exhaust gas flow directly to the brick face 32A. Additionally, the shape of the aperture 46 can be selected to enhance uniformity of the exhaust gas flow 26 at the brick face 32A by mixing the exhaust gas flow prior its entry to the three-way catalytic converter 32. A more uniform exhaust gas flow 26 at the brick face 32A is intended to promote more effective conversion efficiency for reduction of $NO_X$ emissions by the three-way catalytic converter 32. As such, the use of the specifically oriented flow-guide element 44 enables close-coupling of the three-way catalytic converter 32 to the engine 14 for faster catalyst light-off. Additionally, the flow-guide element 44 can ensure maximized performance of the three-way catalytic converter 32 in all operating ranges and temperatures of the engine 14.

As shown in FIG. 2, the uniform exhaust gas flow 26 generated by the flow-guide element 44 positioned in the pipe joint 38 can be directed at an oxygen sensor 48 positioned between the gas seal 40 and the three-way catalytic converter 32. Such an oxygen sensor 48 is typically used to detect and communicate a fuel-air concentration or balance in the exhaust gas flow 26 to an electronic controller 49 prior to the entry of the exhaust gas into the three-way catalytic converter 32. Directing a more uniform exhaust gas flow 26 at the oxygen sensor 48 can facilitate more robust monitoring of an air-fuel balance in the engine 14. For example, specific positioning of the flow-guide element 44 can enable the oxygen sensor 48 to detect a fuel-air imbalance with enhanced precision. Detection of air-fuel imbalance can, in turn, enable more effective identification of a rich-running cylinder in the engine 14, which can be an indicator of cylinder misfire, thereby facilitating more precise diagnostic and control of engine operation via the electronic controller 49.

The flow-guide element 44 may include a portion 50 extending along the first axis X1, concentrically with and beyond the outer surface 42A and the inner surface 42B of the seal element 42. The portion 50 defines one or more slots 52 configured to permit the portion 50 to flex and generate a spring force F during assembly of the pipe joint 38 and coupling of the gas seal 40 with the first exhaust pipe 34 via an interference-type fit. The spring force F thus generated by the slots 52 is intended to maintain a position of the gas seal 40 in the pipe joint 38 during assembly thereof, for example during attachment to either the turbocharger 24 or the exhaust manifold 30. The gas seal 40 can additionally include a feature 54 configured to orient the aperture 46 of the flow-guide element 44 with respect to the pipe joint 38, the exhaust system 28, and the three-way catalytic converter 32. The feature 54 can be configured as a key element, such as a projection (shown in FIG. 4) arranged on the portion 50 that cooperates with a corresponding or matching feature operating as a keyway arranged on the first exhaust pipe 34. Alternatively, the feature 54 can be configured as a keyway, with one of the slots 52 being employed for such a purpose (shown in FIG. 3). The feature 54 configured as a keyway can cooperate with a corresponding projection arranged on the first exhaust pipe 34 to orient the aperture 46 in the pipe joint 38.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A gas seal for a pipe joint in an exhaust system configured to receive an exhaust gas flow from an internal combustion (IC) engine, the gas seal comprising:
   a seal element having an outer surface and an inner surface arranged concentrically about a first axis, wherein the outer surface is configured to seal against a pipe of the exhaust system; and
   a flow-guide element fixed to the seal element at the inner surface of the seal element;
   wherein the flow-guide element defines an aperture having a shape configured to direct and focus an entirety of the exhaust gas flow away from the first axis.

2. The gas seal according to claim 1, wherein the aperture has-one of a circular and a non-circular shape.

3. The gas seal according to claim 2, wherein the aperture is centered on a second axis, and wherein the second axis is spaced apart from the first axis.

4. The gas seal according to claim 1, wherein the seal element is constructed from a matrix of graphite with embedded metal and the flow-guide element is constructed from stainless steel.

5. The gas seal according to claim 1, wherein the outer surface of the seal element includes a conical portion configured to absorb misalignment in the pipe joint.

6. The gas seal according to claim 1, wherein the flow-guide element includes a portion extending along the first axis and concentrically with the outer surface and the inner surface of the seal element, and wherein the portion defines a slot configured to maintain a position of the gas seal in the pipe joint during assembly thereof via a generated spring force.

7. The gas seal according to claim 1, further comprising one of a projection and a keyway configured to orient the aperture of the flow-guide element within the pipe joint.

8. An exhaust system configured to receive an exhaust gas flow from an internal combustion (IC) engine, the exhaust system comprising:
   a pipe joint constructed via a first exhaust pipe connected to a second exhaust pipe;
   an exhaust after-treatment (AT) device fluidly connected to the second exhaust pipe and configured to receive and process the exhaust gas flow downstream of the pipe joint; and
   a gas seal arranged at the pipe joint between the first exhaust pipe and the second exhaust pipe, the gas seal including:
      a seal element having an outer surface and an inner surface arranged concentrically about a first axis, wherein the outer surface is configured to seal the pipe joint; and
      a flow-guide element fixed to the seal element at the inner surface of the seal element;
      wherein the flow-guide element defines an aperture having a shape configured to direct and focus an entirety of the exhaust gas flow away from the first axis and toward the AT device.

9. The exhaust system according to claim 8, wherein the aperture has-one of a circular and a non-circular shape.

10. The exhaust system according to claim 9, wherein the aperture is centered on a second axis, and wherein the second axis is spaced apart from the first axis.

11. The exhaust system according to claim 8, wherein the seal element is constructed from a matrix of graphite with embedded metal and the flow-guide element is constructed from stainless steel.

12. The exhaust system according to claim 8, wherein the outer surface of the seal element includes a conical portion configured to absorb misalignment in the pipe joint.

13. The exhaust system according to claim 8, wherein the flow-guide element includes a portion extending along the first axis and concentrically with the outer surface and the inner surface of the seal element, and wherein the portion defines a slot configured to maintain a position of the gas seal in the pipe joint during assembly thereof via a generated spring force.

14. The exhaust system according to claim 8, wherein the gas seal additionally includes one of a projection and a keyway configured to orient the aperture of the flow-guide element with respect to the pipe joint.

15. A vehicle comprising:
   an internal combustion (IC) engine configured to power the vehicle; and
   an exhaust system configured to receive an exhaust gas flow from the IC engine, the exhaust system having:
      a first exhaust pipe fluidly connected to the IC engine;
      a second exhaust pipe connected to the first exhaust pipe at a pipe joint;
      an exhaust after-treatment (AT) device fluidly connected to the second exhaust pipe and configured to receive and process the exhaust gas flow downstream of the pipe joint; and
      a gas seal arranged at the pipe joint between the first exhaust pipe and the second exhaust pipe, the gas seal including:
         a seal element having an outer surface configured to seal the pipe joint and an inner surface, wherein the outer surface and the inner surface are arranged concentrically about a first axis; and
         a flow-guide element fixed to the seal element at the inner surface of the seal element;
         wherein the flow-guide element defines an aperture having a shape configured to direct and focus an entirety of the exhaust gas flow away from the first axis and toward the AT device.

16. The vehicle according to claim 15, wherein the aperture has-one of a circular and a non-circular shape.

17. The vehicle according to claim 16, wherein the shape of the aperture is centered on a second axis, and wherein the second axis is spaced apart from the first axis.

18. The vehicle according to claim 15, wherein the seal element is constructed from a matrix of graphite with embedded metal and the flow-guide element is constructed from stainless steel.

19. The vehicle according to claim 15, wherein the flow-guide element includes a portion extending along the first axis and concentrically with the outer surface and the inner surface of the seal element, and wherein the portion defines a slot configured to maintain a position of the gas seal in the pipe joint during assembly thereof via a generated spring force.

20. The vehicle according to claim 15, wherein the gas seal additionally includes one of a projection and a keyway configured to orient the aperture of the flow-guide element with respect to the pipe joint.

\* \* \* \* \*